Oct. 18, 1966  O. GARAPOLO  3,279,147
PACKAGING MACHINE
Filed Dec. 10, 1962  2 Sheets-Sheet 1
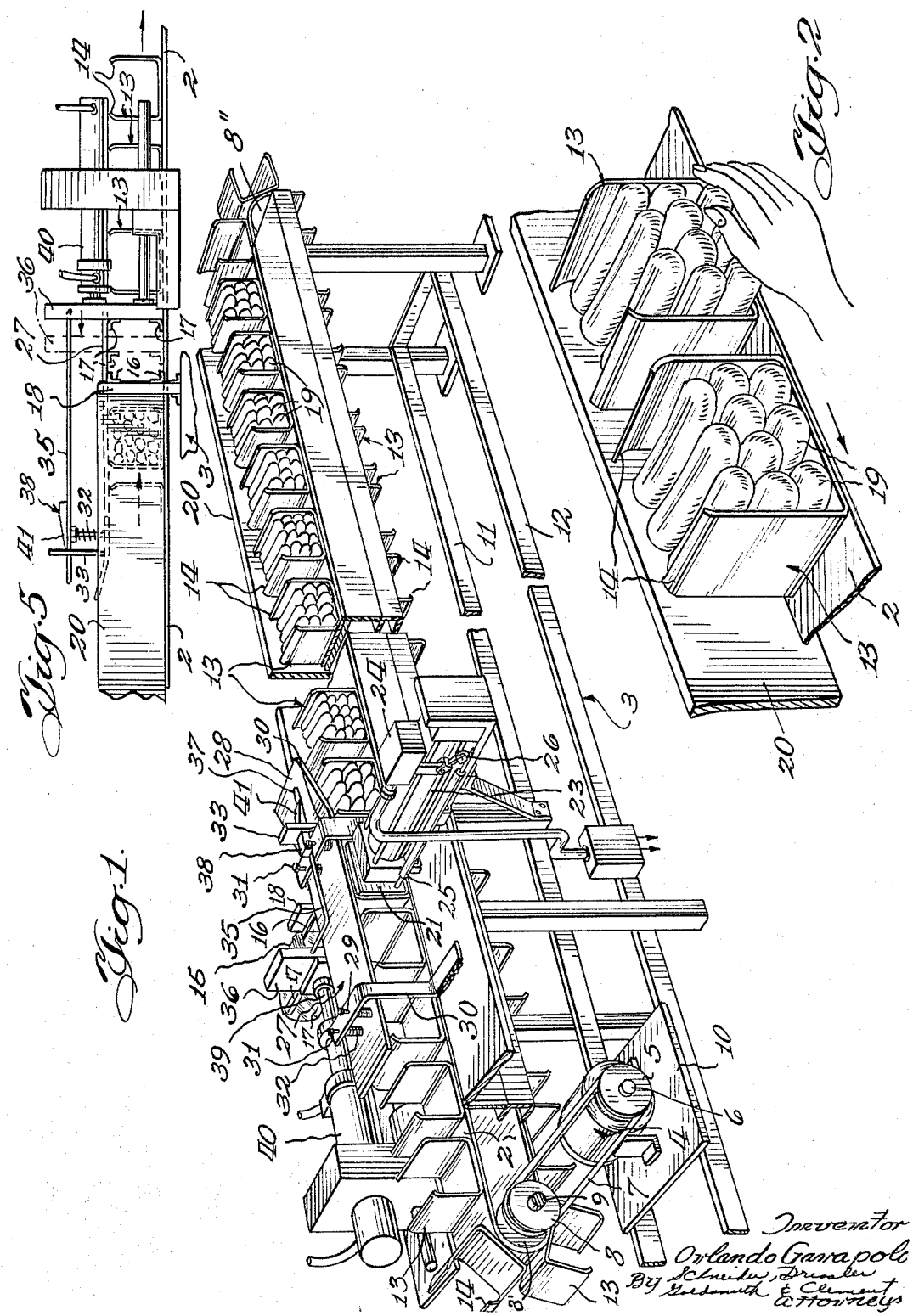

Oct. 18, 1966     O. GARAPOLO     3,279,147
PACKAGING MACHINE
Filed Dec. 10, 1962     2 Sheets-Sheet 2
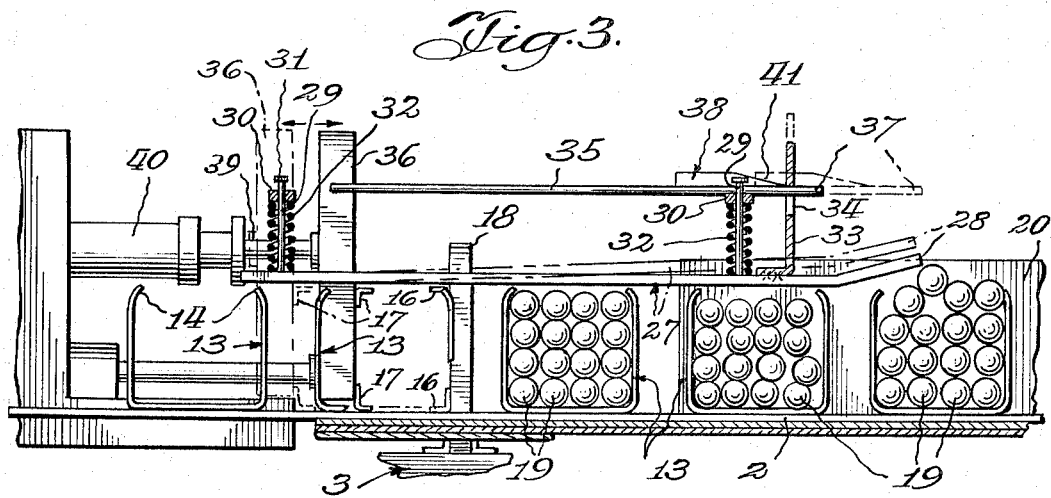
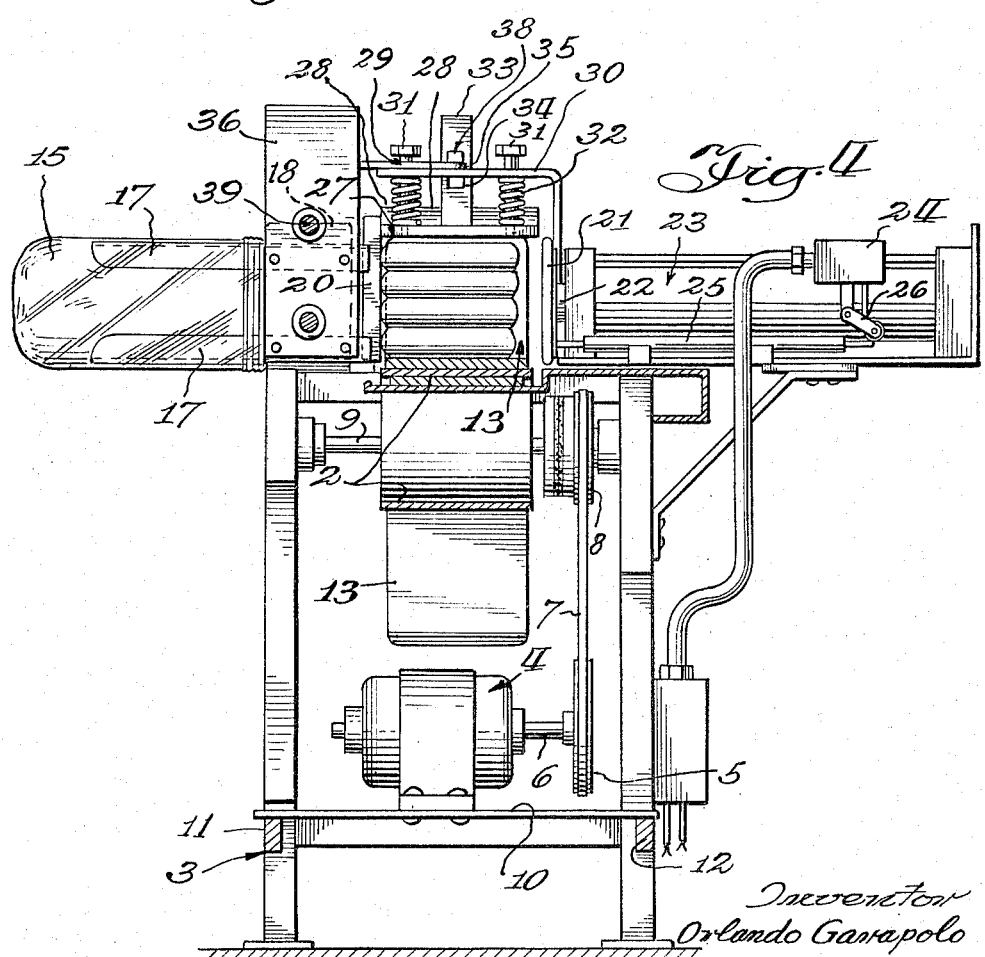
Inventor
Orlando Garapolo
By Schneider, Dressler, Goldsmith & Clement
Attorneys United States Patent Office 3,279,147
Patented Oct. 18, 1966

3,279,147
PACKAGING MACHINE
Orlando Garapolo, Brookfield, Ill., assignor to Wilson & Co., Inc., a corporation of Delaware
Filed Dec. 10, 1962, Ser. No. 243,556
9 Claims. (Cl. 53—252)

This invention relates to meat packaging apparatus and, particularly, to frankfurter packaging apparatus. More particularly, it is concerned with means for increasing the speed and efficiency of the packaging operation.

In accordance with the present invention, U-shaped carriers adapted to receive a predetermined weight or number of unitized meat items such as frankfurters, sausage links, and the like, and hold them as a compact unit are mounted on a continuous conveyor which is adapted to move intermittently. The conveyor moves the carriers between the ram of a pusher device and mechanism adapted to hold an empty receptacle, such as a bag or carton, with throat open to receive meat positioned in the U-shaped carriers. Upon stoppage of a carrier in the position between the ram and the receiver, the ram transfers the meat into the receptacle.

The packaging procedure in use heretofore consisted of a manual operation of placing, for example, a sheet of cellophane or other suitable sheet material in a form, assembling the appropriate weight of frankfurters and manually positioning the frankfurters on the cellophane sheet and in the form. The cellophane sheet was then folded and heat-sealed by hand. Such a packaging operation is slow and requires an operator skilled in the use of heat sealing equipment at every packaging station.

The novel apparatus of this invention is adapted to eliminate the necessity for using sheet material, folding operations, etc., by handling preformed packaging units open only at the material receiving throat and thus to produce a relatively high capacity packaging operation.

More in detail, in accordance with the present invention a continuous conveyor is provided with spaced, U-shaped carriers. An operator places a predetermined number of frankfurters in each U-shaped carrier in generally parallel relationship. Preferably, the operator takes half of the predetermined number of frankfurters required to fill a carrier in each hand, and deposits the frankfurters in a carrier substantially simultaneously to fill the carrier in one operation. An upright board extends parallel to the conveyor near the end of the carriers remote from the operator. The board terminates adjacent the end of the loading zone. The operator hits the frankfurters on the near end and moves them axially until all of them abut the board adjacent the remote end. In this way the frankfurters are arranged with the remote ends even.

The conveyor is driven intermittently past an air operated pushing cylinder. As the conveyor advances, the U-shaped carriers toward the pushing cylinder, the piston rod of a second cylinder moves a pair of bag holding fingers toward other bag holding fingers that are in fixed position. A bag, preferably transparent, of stretchable plastic is placed on the fingers when they are close together. A cam, operatively connected to the piston rod of said second cylinder, lifts the free end of a pressure plate as the U-shaped carriers are being advanced toward the pushing cylinder. The free end of the pressure plate is curved upwardly at a slight angle, and when its free end is lifted by the cam, a U-shaped carrier having the predetermined number of frankfurters positioned therein can move under the pressure plate even if the frankfurters of the upper layer are loose and extend slightly above the upper edges of the carrier.

The pressure plate is substantially flat, except at its free end, and is horizontally disposed above the conveyor. It is spring biased to contact the upper edges of any U-shaped carrier that is aligned with the pushing cylinder. As a carrier moves under the free end of the pressure plate toward the pushing cylinder, the pressure plate presses the franfurters in the upper layer downwardly against the other frankfurters in the carrier to level the top layer and compact the group slightly so that the carrier is completely filled.

As each carrier successively approaches alignment with the pushing cylinder and the bag holding fingers, the piston rod of the second cylinder moves the movable fingers back to their initial positions, thus stretching the bag open, and simultaneously moves the cam back to its initial position, thus releasing the pressure plate. The spring pressure then forces the pressure plate against the upper edges of the carrier that is aligned with the pushing cylinder and the open bag. The pressure plate prevents vertical displacement of any of the frankfurters that are positioned in said carrier. As soon as each successive carrier moves into alignment with the pushing cylinder, the conveyor advancing system is stopped, and a plate mounted on the piston rod of the pushing cylinder moves the frankfurters axially from the aligned carrier into the open bag as a unit.

An interlock control switch that is hooked into the electrical circuit of the conveyor advancing system is located near the rear end of the pushing cylinder. The switch has a pivoted arm extending across the line of travel of a rod that is secured to the rear side of the plate mounted on the piston rod of the pushing cylinder and extends generally parallel to the pushing cylinder. As the piston rod of the pushing cylinder starts its outward stroke, it releases the arm of the switch which then swings downwardly to energize the switch. The electrical circuit is so arranged that the conveyor advancing system cannot operate when the switch is energized, and the conveyor cannot move while the piston rod of the pushing cylinder is in any but a retracted position.

When the plate mounted on the piston rod of the pushing cylinder moves rearwardly, the rod secured to said plate trips the switch and de-energizes it, thereby permitting the conveyor to be moved. As the conveyor resumes its advancing movement, the piston rod of the second cylinder moves the movable pair of bag holding fingers toward the fixed bag holding fingers so that the filled bag can be removed. As each filled bag is removed from the fingers it is transported in any suitable manner to a sealing device for sealing the open end of the bag. Another bag is placed on the bag holding fingers and is stretched open by retraction of the piston rod of the second cylinder which moves the bag holding fingers apart as the next U-shaped carrier approaches the pushing cylinder.

The structure by means of which the above-mentioned and other advantages of the invention may be attained will be fully described in the following specification, taken in conjunction with the accompanying drawings showing a preferred illustrative embodiment of the invention in which:

FIGURE 1 is a perspective view of the frankfurter packaging apparatus embodying the invention;

FIGURE 2 is an enlarged fragmentary perspective view showing how the frankfurters are aligned in the carriers;

FIGURE 3 is an enlarged fragmentary side elevational view;

FIGURE 4 is an enlarged end elevational view, with parts broken away to facilitate illustration of the invention; and FIGURE 5 is a side elevational view, on a reduced scale, looking at the opposite side of FIGURE 3.

In the drawings, the apparatus comprises an endless belt conveyor 2 extending along the longitudinal axis of a frame 3. The conveyor is driven in one direction by a motor 4 having a pulley 5 rotated by its shaft 6. An endless belt 7 extending over pulley 5 also extends over a clutch sheave 8 mounted on a shaft 9. A roller 8', mounted on shaft 9, rotatably supports one end of the conveyor 2. The other end of the conveyor is supported by a roller 8". Motor 4 is mounted on a platform 10 supported on a pair of longitudinal rails 11, 12. The conveyor has a plurality of U-shaped carriers 13 mounted thereon. The carriers have their opposite ends open, and their upper edges are curved inwardly slightly, as indicated at 14. The curved edges 14 of the carriers 13 do not interfere with the axial movement of the frankfurters 19 but hold the outer frankfurters of the top layer against displacement in any other direction as the frankfurters are pushed axially out of carriers 13 into a stretchable plastic bag 15 having an open end aligned with the carrier. Although the bag may be of any suitable material, a clear, transparent stretchable plastic material is preferred.

Bag 15 is mounted on a pair of fingers 16 mounted on a fixed plate 18 and a pair of fingers 17 mounted on a movable plate 36. The plate 18 is mounted on the machine in any suitable manner, and the plate 36 is mounted on the end of a piston rod 39 that slides in a second cylinder 40. The fingers of each pair of fingers are preferably spaced a distance slightly greater than the height of the group of frankfurters that is to be packaged in the bag. The bag is manually positioned on the fingers when piston rod 39 is at its outermost position or close to said outermost position. When piston rod 39 is retracted, it carries plate 36 and fingers 17 with it, thereby stretching the bag open. The frankfurters 19 are pushed into the bag when it is stretched open, and the filled bag is removed when piston rod 39 is moving outwardly.

Carriers 13 are filled by operators positioned at the front of the machine, as viewed in FIGURE 1. The operators reach into a supply trough (not shown) and fill the carriers manually with a predetermined number of frankfurters. Preferably, in order to speed the loading operation, the supply trough is positioned so that each operator can stick both hands in the trough and fill one carrier in one two-handed operation. The operators align the frankfurters 19 in general parallel relationship as they place them in the carriers. A flat board 20 is mounted on the frame of the machine adjacent the remote ends of the carriers and extending throughout the length of the loading zone. Each operator hits one end of the frankfurters with the hand, as shown in FIGURE 2, to move them axially so that the remote ends of the frankfurters are aligned in a common plane before the frankfurters are moved out of the loading zone.

Conveyor 2 is moved intermittently, and is stopped for a short interval every time a carrier 13 is moved into alignment with a flat plate 21 secured to the piston rod 22 of an air operated pushing cylinder 23. Although an air cylinder is preferred, the pushing cylinder may be operated in any suitable manner. An interlock control switch 24 is hooked into the electrical circuit of the conveyor advancing system in such a manner that the conveyor cannot advance except when the switch is de-energized. The purpose of this interlock control is to make sure that the conveyor cannot move the carriers to the left, as seen in FIGURE 1, when plate 21 projects outwardly from its retracted position. A rod 25 extending from the rear side of plate 21 trips arm 26 of switch 24 to de-energize it as piston rod 22 moves plate 21 into its retracted position. As piston rod 22 moves outwardly, plate 21 moves to the left, as seen in FIGURE 4, and arm 26 moves pivotally downwardly to energize the switch and stop movement of the conveyor. Arm 26 may be weighted, or may be spring-pressed. Cylinder 40 is synchronized with cylinder 23 so that the piston rod 39 is in its retracted position, in which bag 15 is stretched open, as piston rod 22 is moved outwardly to cause plate 21 to push the frankfurters 19 out of a carrier 13.

Carriers 13 are open at the top, and some of the frankfurters may project slightly above the upper edges of the carriers as they are moved toward push cylinder 23. A pressure plate 27 is positioned above the carriers and extends from the loading zone past the carrier aligned with the push cylinder. The pressure plate is flat throughout most of its length but its forward end is curved upwardly, as indicated at 28. Studs 29 rigidly secured to the top of pressure plate 27 extend through apertures in brackets 30 and are headed, as indicated at 31, so that springs 32 urge the pressure plate downwardly against the upper edges of carriers 13. A plate 33 rigidly secured to pressure plate 27 adjacent its forward end extends upwardly therefrom and is provided with an aperture 34. A rod 35 having one end rigidly secured to a plate 36 has its other end 37 projecting through aperture 34. Rod 35 normally engages the upper end of aperture 34 toward which it is urged by springs 32.

A wedge shaped cam 38 is rigidly mounted on rod 35 a short distance from the forward end of the rod. In the retracted position of plate 36 the front end of cam 38 is adjacent plate 33 but does not project into aperture 34. Plate 36 is secured to one end of the piston rod 39 that is slidable in the cylinder 40. Piston rod 39 reciprocates plate 36 to move the wedge-shaped cam into and out of aperture 34. As the cam is moved to the right, as seen in FIGURE 3, the inclined surface 41 engages the upper end of aperture 34. Since the vertical position of rod 35 is fixed, the inclined surface of the cam forces plate 33 upwardly against the action of the springs 32, thereby lifting the end 28 of plate 27 to which plate 33 is rigidly secured.

The electrical circuits for controlling the operations of cylinders 23 and 40 are interconnected so that the piston rods of both cylinders remain in retracted position when movement of the conveyor advancing system is started by de-energization of switch 24. In the retracted position of piston rod 39 the pressure plate 27 is forced down against the upper edges of carrier 13. The pressure plate compacts the frankfurters vertically and holds them in place so that they can be pushed axially into bag 15 by plate 21 when movement of the conveyor advancing system is stopped with the frankfurters in one of the carriers aligned with plate 21. The position of movable fingers 17 when piston rod 39 is in its retracted position keeps bag 15 stretched open for the reception of the frankfurters.

The de-energization of switch 24 starts advancing movement of conveyor 2 and movement of piston rod 39. Piston rod 39 moves outwardly to permit removal of the filled bag 15 and replacement of the filled bag by an empty bag at the same time piston rod 39 moves outwardly to cause cam 38 to lift the front end 28 of pressure plate 27. As the carriers move toward alignment with push cylinder 23, they move under end 28 of the pressure plate which rolls the top frankfurters into compact relationship with the rest of the frankfurters in the carrier. By the time the carrier reaches the position in which it is aligned with push cylinder 23, piston rod 39 is retracted to stretch bag 15 in its open position, and pressure plate 27 is firmly engaged with the upper edges of the carrier.

Although I have described a preferred embodiment of the invention in considerable detail, it will be understood that the description thereof is intended to be illustrative, rather than restrictive, as many details of construction may be modified or changed without departing from the spirit or scope of the invention. Accordingly, I do not desire to be restricted to the exact structure described.

I claim:

1. A frankfurter packaging apparatus comprising a fixed member and a movable member adapted in one position to cooperate with said fixed member for holding a bag with one end open, means for moving said movable member into and out of said one position, a pusher aligned axially with said bag in spaced relationship to said open end, a conveyor to move a group of frankfurters between said pusher and said open bag end, said conveyor having one edge adjacent said bag holding means and its opposite edge adjacent said pusher, a motor for moving said conveyor, a carrier on said conveyor for holding said group of frankfurters with the frankfurters parallel to said pusher, means for moving said pusher outwardly to push said group of frankfurters into said bag as a unit and means actuated by said pusher for holding said first mentioned means against moving said movable member and for preventing said motor from moving said conveyor during the outward movement of said pusher.

2. A frankfurter packaging apparatus comprising a conveyor, means on said conveyor for holding a plurality of groups of frankfurters with the frankfurters extending transversely of said conveyor, means for moving said conveyor, means for holding a bag transversely of said conveyor with one end adjacent one edge of said conveyor open, pushing means aligned with said bag on the opposite side of said conveyor, control means interconnected with said pushing means and operable automatically to stop said conveyor as each of said groups of frankfurters is moved into alignment with said pushing means and means for moving said pushing means transversely of said conveyor to move the group of frankfurters aligned with said pushing means into said bag as a unit.

3. A frankfurther packaging apparatus comprising a conveyor, means on said conveyor in uniformly spaced relationship for holding a plurality of groups of frankfurters, each of said groups comprising a predetermined number of frankfurters extending transversely of said conveyor, means for moving said conveyor, means for holding a bag with an open end adjacent one edge of said conveyor, pushing means aligned with said bag on the opposite side of said conveyor, control means operable automatically to stop said conveyor as each of said frankfurter holding means is moved into alignment with said pushing means, a pressure plate cooperating with said frankfurter holding means to compress said frankfurters as they are moved into alignment with said pushing means, means for automatically raising one end of said pressure plate to permit each group of frankfurters to move under said pressure plate as it approaches the position of alignment with said pushing means, and means for moving said pushing means transversely of said conveyor to move the group of frankfurters aligned with said pushing means into said bag as a unit.

4. A frankfurter packaging apparatus comprising a conveyor, means secured to said conveyor in uniformly spaced realtionship for holding a plurality of groups of frankfurters, each of said groups comprising a predetermined number of frankfurters extending transversely of said conveyor, means for moving said conveyor, means for holding a bag of stretchable plastic material stretched in open position transversely of said conveyor with the open end of said bag adjacent one edge of said conveyor, pushing means aligned with said open bag on the opposite side of said conveyor, control means interconnected with said pushing means and operable automatically to stop said conveyor as each of said frankfurter holding means is moved into alignment with said pushing means, a pressure plate cooperating with said frankfurter holding means to compress the frankfurters aligned with said pushing means, and means for moving said pushing means transversely of said conveyor to move the group of frankfurters aligned with said pushing means into said bag as a unit.

5. A frankfurter packaging apparatus comprising a conveyor, means on said conveyor for holding a plurality of groups of frankfurters, each of said groups comprising a predetermined number of frankfurters extending transversely of said conveyor, means for moving said conveyor, means for holding a bag transversely of said conveyor with an open end adjacent one edge of said conveyor, pushing means aligned with said open bag on the opposite side of said conveyor, means to stop said conveyor as each of said frankfurter holding means is moved into alignment with said pushing means, a pressure plate cooperating with said frankfurter holding means to compress the frankfurters aligned with said pushing means, means for moving said pushing means transversely of said conveyor to move the group of frankfurters aligned with said pushing means into said bag as a unit, and a switch actuated by said pushing means to start the conveyor moving means when said pushing means is retracted.

6. A frankfurter packaging apparatus comprising a conveyor, means on said conveyor for holding a plurality of groups of frankfurters, each of said groups comprising a predetermined number of frankfurters extending transversely of said conveyor, means for moving said conveyor, means for holding a bag with an open end adjacent one edge of said conveyor, pushing means aligned with said open bag on the opposite side of said conveyor, control means operable automatically to stop said conveyor as each of said frankfurter holding means is moved into alignment with said pushing means, a pressure plate cooperating with said frankfurter holding means to compress said frankfurters as they are moved toward said pushing means and hold said frankfurters compressed within said frankfurter holding means when they are aligned with said pushing means, a cam operable to raise one end of said pressure plate as each group of frankfurters approaches said pressure plate, means to return said pressure plate to its frankfurter compressing position as each group of frankfurters moves under said pressure plate, and means for moving said pushing means transversely of said conveyor to move the group of frankfurters aligned with said pushing means into said bag as a unit.

7. A frankfurter packaging apparatus comprising a conveyor, means on said conveyor for holding a group of frankfurters disposed transversely of said conveyor, means for moving said conveyor, a pair of fixed fingers and a pair of movable fingers on one side of said conveyor for holding a bag of stretchable plastic material with the open end of said bag adjacent one edge of said conveyor, means for moving said movable fingers relative to said fixed fingers to stretch said bag into open position, pushing means aligned with said bag holding means adjacent the opposite edge of said conveyor, means interconnected with said pushing means for stopping said conveyor with said frankfurter holding means aligned with said pushing means and said bag holding fingers and for holding said movable fingers against movement out of said bag opening position as each group of frankfurters is being pushed into its bag, a pressure plate engageable with said frankfurter holding means to compress a group of frankfurters within said frankfurter holding means, and means for moving said pushing means to push said group of frankfurters into said bag as a unit.

8. A frankfurter packaging apparatus comprising a conveyor, means on said conveyor for holding a group of frankfurters disposed transversely of said conveyor, means for moving said conveyor, a plurality of fingers on one side of said conveyor for holding a bag of stretchable plastic material with the open end of said bag adjacent one edge of said conveyor, means for moving said fingers apart to stretch said bag into open position, pushing means aligned with said bag holding means and extending transversely of said conveyor adjacent the opposite edge of said conveyor, means interconnected with said pushing means for stopping said conveyor with said frankfurter holding means aligned with said pushing means and said bag holding fingers and for holding said fingers against movement out of said bag opening position as each group of frankfurters is being pushed into its bag, a pressure plate engageable with said frankfurther holding means to compress a group of frankfurters within said frankfurter holding means, and means for moving said pushing means to push said group of frankfurters into said bag as a unit.

9. A frankfurter packaging apparatus comprising a conveyor, a carrier on said conveyor for holding a group of frankfurters disposed transversely of said conveyor, means for moving said conveyor, a plurality of fingers on one side of said conveyor for holding a bag of stretchable plastic material with the open end of said bag adjacent one edge of said conveyor, means for moving said fingers apart to stretch said bag into open position, pushing means aligned with said bag holding means and extending transversely of said conveyor adjacent the opposite edge of said conveyor, means interconnected with said pushing means for stopping said conveyor with said frankfurter holding means aligned with said pushing means and said bag holding fingers and for holding said fingers against movement out of said bag opening position as each group of frankfurters is being pushed into its bag, a pressure plate engageable with frankfurters in said carrier to compress said frankfurters by rolling the uppermost frankfurters against the lower ones as said carrier is moved toward alignment with said pushing means and bag holding fingers, said pressure plate holding said frankfurters compressed in said alignment position, and means for moving said pushing means to push said group of frankfurters into said bag as a unit.

References Cited by the Examiner
UNITED STATES PATENTS

| | | | |
|---|---|---|---|
| 1,998,382 | 4/1935 | Neff | 53—252 |
| 2,561,410 | 7/1951 | Peters | 53—261 |
| 2,781,622 | 2/1957 | Shoffner | 53—258 |
| 2,831,585 | 4/1958 | Patrick | 53—164 XR |
| 3,027,697 | 4/1962 | Croasdale | 53—62 |
| 3,107,793 | 10/1963 | Frank | 53—249 X |
| 3,181,956 | 5/1965 | Clark, et al. | 53—261 X |

FRANK E. BAILEY, *Primary Examiner.*

A. E. FOURNIER, P. H. POHL, *Assistant Examiners.*